US012768415B2

(12) United States Patent
Lang et al.

(10) Patent No.: US 12,768,415 B2
(45) Date of Patent: Oct. 20, 2026

(54) METHOD FOR DETERMINING THE BRAKING FORCE ON VEHICLES

(71) Applicant: ZF CV Systems Global GmbH, Bern (CH)

(72) Inventors: Philipp Lang, Luebeck (DE); Alexander Rodenberg, Braunschweig (DE); Axel Stender, Hameln (DE); Oliver Topic, Hannover (DE); Jan-Christoph von der Beeke, Algermissen (DE)

(73) Assignee: ZF CV Systems Global GmbH, Bern (CH)

( * ) Notice: Subject to any disclaimer, the term of this patent is extended or adjusted under 35 U.S.C. 154(b) by 203 days.

(21) Appl. No.: 18/427,425

(22) Filed: Jan. 30, 2024

(65) Prior Publication Data

US 2024/0167525 A1 May 23, 2024

Related U.S. Application Data

(63) Continuation of application No. PCT/EP2022/071163, filed on Jul. 28, 2022.

(30) Foreign Application Priority Data

Aug. 3, 2021 (DE) ..................... 10 2021 120 185.3

(51) Int. Cl.
*F16D 66/00* (2006.01)
*G01L 5/00* (2006.01)

(52) U.S. Cl.
CPC ............ *F16D 66/00* (2013.01); *G01L 5/0019* (2013.01); *G01L 5/0023* (2013.01); *F16D 2066/005* (2013.01); *F16D 2066/006* (2013.01)

(58) Field of Classification Search
None
See application file for complete search history.

(56) References Cited

U.S. PATENT DOCUMENTS

2003/0010132 A1 1/2003 Scorteanu et al.
2004/0163900 A1 8/2004 Beuerle et al.
2007/0029872 A1 2/2007 Kurata et al.
(Continued)

FOREIGN PATENT DOCUMENTS

CN 102147319 A 8/2011
DE 40 24 811 A1 2/1992
(Continued)

OTHER PUBLICATIONS

English translation and Written Opinion of the International Searching Authority dated Nov. 16, 2022 for international application PCT/EP2022/071163 on which this application is based.
(Continued)

*Primary Examiner* — Suman K Nath
(74) *Attorney, Agent, or Firm* — Walter Ottesen, P.A.

(57) ABSTRACT

A method is for determining the braking force of vehicles with wheel brakes. In the method, a reaction force occurring on the vehicle during braking is determined, at least indirectly. An axle assembly includes: an axle; a wheel brake mounted on the axle; and, at least one sensor configured to measure variables for determining reaction forces during braking.

20 Claims, 5 Drawing Sheets

(56) References Cited

U.S. PATENT DOCUMENTS

| | | | | |
|---|---|---|---|---|
| 2020/0377064 | A1* | 12/2020 | Frea | B60T 8/172 |
| 2022/0252121 | A1 | 8/2022 | Camozzi et al. | |
| 2022/0297661 | A1* | 9/2022 | Kircher | B60T 7/045 |

FOREIGN PATENT DOCUMENTS

| | | | | |
|---|---|---|---|---|
| DE | 197 45 581 | A1 | 4/1999 | |
| DE | 101 42 644 | A1 | 4/2003 | |
| DE | 10 2012 223 104 | A1 | 6/2014 | |
| DE | 10 2017 009 127 | A1 | 1/2019 | |
| EP | 0 504 731 | A2 | 9/1992 | |
| EP | 1 749 720 | A1 | 2/2007 | |
| JP | H10-267767 | A | 10/1998 | |
| JP | 2001-294143 | A | 10/2001 | |
| WO | WO-2019001951 | A1 * | 1/2019 | G01L 5/28 |
| WO | 2019/111127 | A1 | 6/2019 | |
| WO | 2020/250187 | A1 | 12/2020 | |

OTHER PUBLICATIONS

International Search Report of the European Patent Office dated Nov. 16, 2022 for international application PCT/EP2022/071163 on which this application is based.
English translation of the Office Action of the Chinese National Intellectual Property Administration dated Mar. 19, 2026 for the corresponding Chinese patent application No. 202280045724.0.
English translation and second Office Action of the Chinese National Intellectual Property Administration dated Jul. 31, 2026 for the corresponding Chinese patent application No. 202280045724.0.

* cited by examiner

METHOD FOR DETERMINING THE BRAKING FORCE ON VEHICLES

CROSS-REFERENCE TO RELATED APPLICATIONS

This application is a continuation application of international patent application PCT/EP2022/071163, filed Jul. 28, 2022, designating the United States and claiming priority from German application 10 2021 120 185.3, filed Aug. 3, 2021, and the entire content of both applications is incorporated herein by reference.

TECHNICAL FIELD

The disclosure relates to a method for determining the braking force on vehicles with wheel brakes. In addition, the disclosure relates to an axle with wheel brakes and a vehicle with at least one corresponding axle.

BACKGROUND

Wheel brakes on vehicles, especially motor vehicles or commercial vehicles, do not have a permanent uniform effect. For example, the braking effect can deteriorate due to so-called fading of brake pads as a result of insufficient temperature introduction in vehicles with wear-free continuous brakes or recuperation devices. Conversely, mechanical defects, so-called hanging of the brake, can cause a higher braking force than intended. In practice, such defects can hardly be or may not be detected by the driver. Insufficient braking force is usually only detected in the course of legal inspections, a dragging or hanging brake only by strong temperature generation, which has then already caused consequential damage to the brake disc, wheel bearing or other parts. This results in a potential danger to other road users.

In order to determine that the brakes are in perfect condition, extensive checks on a roller dynamometer are necessary. For the measurement on the roller dynamometer, the vehicle must be driven over the roller dynamometer by a workshop employee with a defined minimum axle load. This requires time and, under certain circumstances, travel distances, as not every vehicle operator has a brake test bench. In addition, the measurement is only a snapshot.

SUMMARY

It is an object of the disclosure to provide a method for determining the braking force on vehicles with wheel brakes during braking.

This object is, for example, achieved via a method for determining a braking force on vehicles with wheel brakes. The method includes determining, at least indirectly, a reaction force occurring on the vehicle during braking.

In this context, braking force is understood to mean a force acting between the wheel and the road in the longitudinal direction of the vehicle in the opposite direction to the driving speed when the vehicle brakes. As soon as braking is applied, reaction forces occur on the vehicle, which can be measured in different ways and which are representative of the braking force.

According to another aspect of the disclosure, the reaction force can be determined separately for each wheel brake. This is preferably possible by determining the reaction forces in close proximity to each wheel brake. In this way, the braking force can be determined individually for each wheel brake. The measured reaction forces can be recorded and used for the control of the wheel brakes and/or as a database for maintenance work.

According to a further aspect of the disclosure, for the determination of the reaction force at least a change in mechanical variables,
a change in magnetic variables, or
a change in electrical variables are measured. Which of the variables are measured depends on the availability and cost of the corresponding measuring equipment or sensors.

According to a further aspect of the disclosure, for the determination of the reaction force at least an elastic deformation,
a mechanical force,
a change in the magnetic field,
a change in an electrical resistance,
a change in a magnetic resistance,
combinations of the above alternatives are measured. The measurement can also be carried out indirectly. For example, an elastic deformation can cause a change in an electrical resistance, as with a strain gauge.

According to another aspect of the disclosure, strain gauges or force measurement bolts can be used as sensors for measuring a mechanical deformation. Strain gauges are low-cost sensors that can be used to measure very small changes in length in a simple way. Force measurement bolts are also known as load measurement bolts and are also inexpensive standard components. These measure the change in an electrical resistance or a change in a magnetic field that occurs during mechanical deformation.

According to another aspect of the disclosure, the reaction force on a component between wheel brakes inclusively and the chassis frame inclusively can be determined. Preferably, the deformation of the component is measured during braking. The component itself can also be part of the wheel brake or the chassis frame or belong to a component that is held between the wheel brake and the chassis frame.

According to another aspect of the disclosure, the reaction force can be determined at a transition between two components between wheel brakes inclusively and the chassis frame inclusively. For example, the reaction force can measurably change distances between two components.

According to another aspect of the disclosure, the reaction force can be determined by a torsion measurement on an axle tube. Trailers in particular have axles with axle tubes. The axle tube is mounted non-rotatably in axle brackets on the chassis frame and itself holds a wheel with a wheel bearing and a wheel brake at each free end. The wheel brake is supported by the axle tube in the circumferential direction, so that every braking operation leads to a torsion of the axle tube. This torsion can be measured by appropriately adapted sensors and is also a measure of the braking force that occurs during braking. Typically, the axle tube is a high-precision component, so a sensor intended for the axle tube does not need to be calibrated individually for each axle tube. The torsion measurement is carried out on the axle tube, in particular between the wheel brake and the axle bracket.

According to another aspect of the disclosure, the reaction force can be determined by a bending measurement on a brake pad carrier. During braking, the brake pad carrier undergoes very small deformations, which can be measured with appropriately adapted sensors.

According to another aspect of the disclosure, the reaction force can be determined by a bending measurement on a brake caliper mount. The brake caliper mount undergoes very small deformations during braking, which can be measured with appropriately adapted sensors.

According to another aspect of the disclosure, the reaction force can be determined by a bending measurement on a bolt between a trailing arm for an axle and a retaining bracket for the trailing arm. The axle or axle tube can be held on the vehicle frame by trailing arms. For this purpose, the chassis frame can have suitable retaining brackets (also known as bearing blocks or spring shoes). The trailing arm is held in the retaining bracket by a bolt and the bolt undergoes a slight deformation during braking, which can be measured with appropriately adapted sensors.

According to another aspect of the disclosure, the reaction force can be determined by measuring a mechanical deformation on a retaining bracket for a trailing arm of an axle. The retaining bracket itself can experience a measurable deformation during braking, especially bending.

According to another aspect of the disclosure, an axle load can also be determined, at least indirectly. The axle load can be determined by at least one additional sensor or, together with the reaction force occurring during braking, by a common sensor. Preferably, the sensor is located on the axle or on a component connected to the axle.

According to another aspect of the disclosure, the axle load can be determined by measuring a mechanical deformation via strain gauges or force measurement bolts. Mechanical deformation is, in particular, a bending or torsion of a component.

An axle assembly according to the disclosure includes: an axle; a wheel brake mounted on the axle; and, at least one sensor configured to measure variables for determining reaction forces during braking. The sensor determines the reaction forces, at least indirectly. The braking forces can be inferred from the reaction forces. Preferably, these are rigid axles, non-driven axles or combinations thereof. However, axles of a different kind may also be formed according to the disclosure. In addition, the disclosure can be used in vehicles with independent suspension.

According to another aspect of the disclosure, sensors for measuring the variables for the determination of reaction forces can be provided for all wheel brakes. As a result, the braking force for each wheel brake can be determined individually from the reaction force that occurs.

According to a further aspect of the disclosure, at least one of the following sensors can be provided for the determination of the reaction forces:

- strain gauges
- force measurement bolts,
- piezoelectric sensors,
- magnetoelastic sensors,
- magnetostrictive sensors,
- combinations of the above alternatives.

Such sensors are well-known and available as standard components.

According to another aspect of the disclosure, an axle tube can be provided with at least one sensor for the determination of the reaction forces. The axle tube is a rigid and easily accessible component on the axle, so that a sensor can be easily arranged there. Sensors can also be connected to the axle tube ex works.

According to another aspect of the disclosure, the axle tube can be provided with at least one sensor for torsion measurement. During braking, the axle tube twists slightly, which can be measured with an adapted sensor.

According to another aspect of the disclosure, the sensor for torsion measurement can be a strain gauge, wherein the strain gauge can be arranged at an angle, that is, at an angle to the circumferential direction of the axle tube. The aforementioned oblique arrangement is particularly good at detecting the torsion that occurs in the axle tube. The angle is preferably 30 to 60 degrees.

According to another aspect of the disclosure, the sensor can be a force measurement bolt, which holds a trailing arm for an axle in a retaining bracket. The retaining bracket is held on the vehicle frame and serves as a bearing for one end of the trailing arm. The connection between the trailing arm and the retaining bracket can be made via the force measurement bolt.

According to another aspect of the disclosure, the sensor can be a strain gauge arranged on a brake pad carrier. The brake pad carrier deforms slightly during braking depending on the braking force that occurs. This can be detected by the strain gauge.

According to another aspect of the disclosure, the sensor can be a strain gauge arranged on a brake caliper mount. The brake caliper mount also deforms depending on the braking force that occurs, which can be measured with the strain gauge.

According to another aspect of the disclosure, two sensors can be arranged to determine the reaction force for a wheel brake, wherein the sensors are oriented differently, in such a way that variables can be measured in different directions. For example, braking forces can be reliably determined when driving forward and reversing. Two strain gauges for torsion measurement on the axle tube can be arranged perpendicular to each other or as mirror images. For example, components subjected to bending can be provided with a strain gauge on a front surface and one on a rear surface. In addition, different measuring directions can already be realized in one sensor.

According to another aspect of the disclosure, at least one sensor for measuring an axle load can be provided on the axle. The sensor can be provided for measuring the reaction force during braking additionally or at the same time. Preferably, the sensor is located on a top surface and/or bottom surface of the axle.

According to another aspect of the disclosure, at least one strain gauge can be provided on the axle as a sensor for measuring the axle load. The strain gauges can be glued to the surface of the axle or joined to the axle in some other way.

A vehicle according to the disclosure includes an axle assembly according to the disclosure. The vehicle is preferably a trailer vehicle but can also be a motor vehicle.

BRIEF DESCRIPTION OF DRAWINGS

The invention will now be described with reference to the drawings wherein.

DETAILED DESCRIPTION

Figure 1:
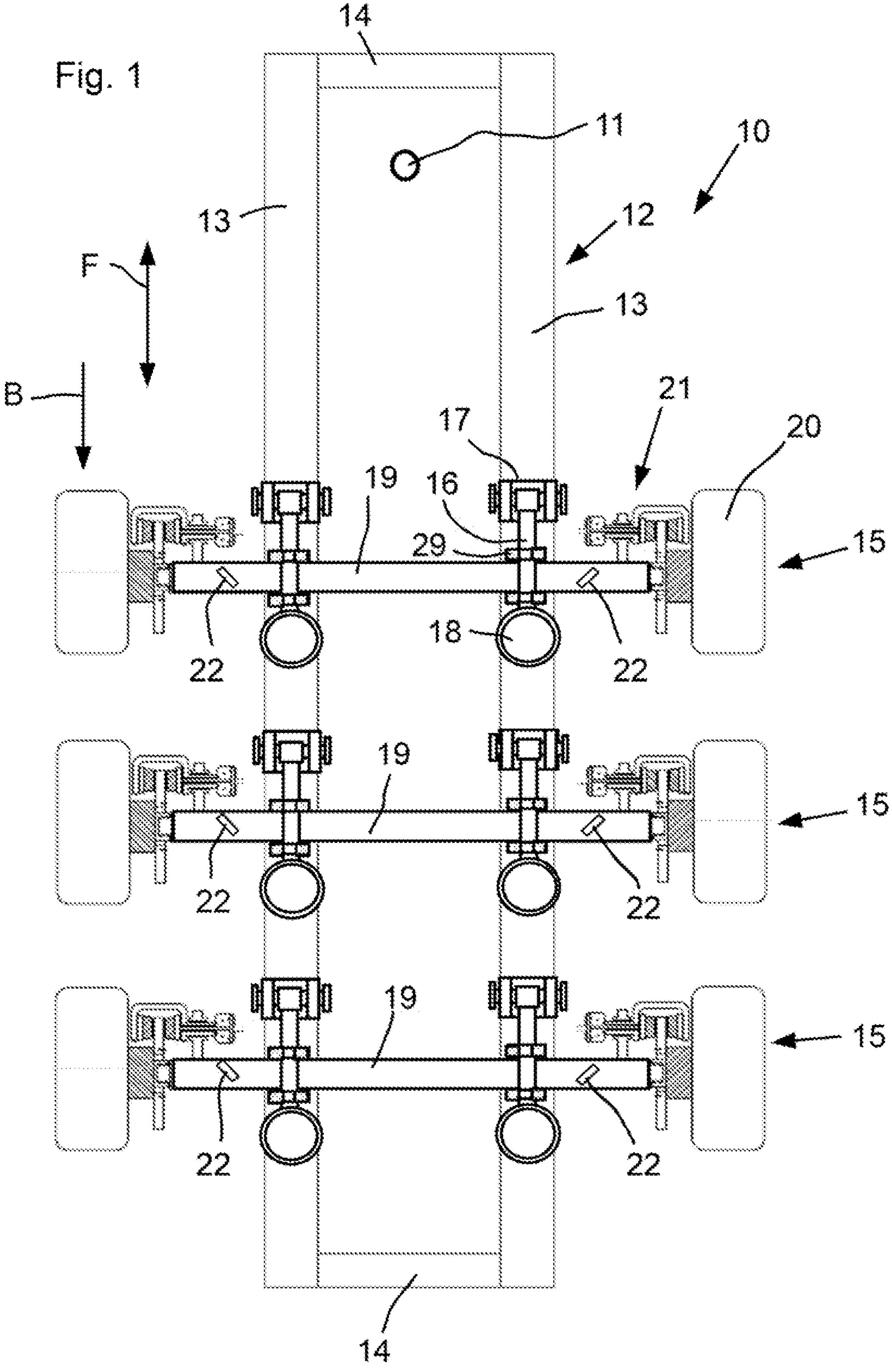
FIG. 1 shows a top view of a semi-trailer chassis with axles and disc brakes.

A chassis 10 for a trailer vehicle can be seen in FIG. 1. In this case, the trailer vehicle is a semi-trailer with a king pin 11.

Three axles 15 are mounted under a chassis frame 12 with longitudinal members 13 and cross members 14. The axles 15 are held non-rotatably with axle brackets 29 on trailing arms 16, which are hinged on a retaining bracket bearing block 17 on one side and on the other side act on an air suspension bellows 18, see also FIG. 2.

Each axle 15 has a continuous axle tube 19, at the ends of which wheels 20 with wheel brakes 21 are mounted. During braking, a braking force B acts parallel to the longitudinal direction of the vehicle F, see FIG. 2. Depending on the braking force B, reaction forces occur on the chassis, the effects of which can be detected to determine the braking force B.

On the axle tubes 19, sensors 22 are arranged between the wheel brakes 21 and the axle mounts 29. The sensors 22 shown in FIG. 1 are preferably strain gauges, which measurably change their electrical resistance when their length changes. For this purpose, the strain gauges (sensors 22) with their measuring direction M are kept at an angle to the circumferential direction U of the respective axle tube 19, see FIG. 3. At the same time, this results in an angle relative to a longitudinal direction L of the respective axle 15. The angle of the measuring direction M relative to the circumferential direction U of the respective axle tube 19 is preferably 30 to 60 degrees. The orientation and angle depend on a reaction force that occurs in practice during braking, which depends on the braking force B, and on the resulting torsion of the axle tubes 19. This can be determined by experiments.

Figure 2:
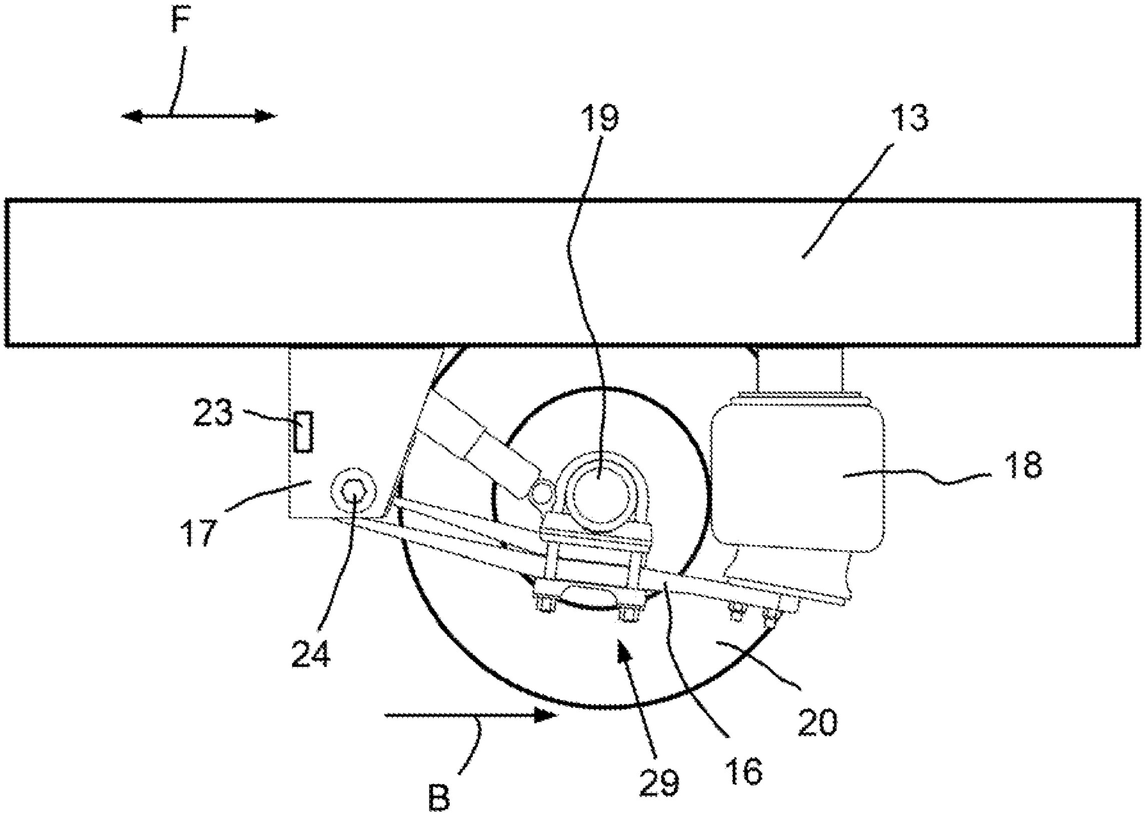
FIG. 2 shows a side view of a wheel suspension with a trailing arm on the axle tube.

FIG. 2 shows two further possible installation locations for sensors 23, 24. Sensor 23 is also a strain gauge, arranged on the retaining bracket 17. During braking, a reaction force dependent on the braking force B acts on the retaining bracket 17, which causes a slight bending of the retaining bracket 17 and can be detected by the sensor 23.

The trailing arm 16 is hinged at one end with a bolt in the retaining bracket 17. The bolt can be a force measurement bolt and thus the sensor 24 at the same time. During braking, the force measurement bolt experiences a reaction force depending on the effective braking force B and consequently a slight deflection, which is detectable and can be evaluated to determine the braking force B.

Figure 3:
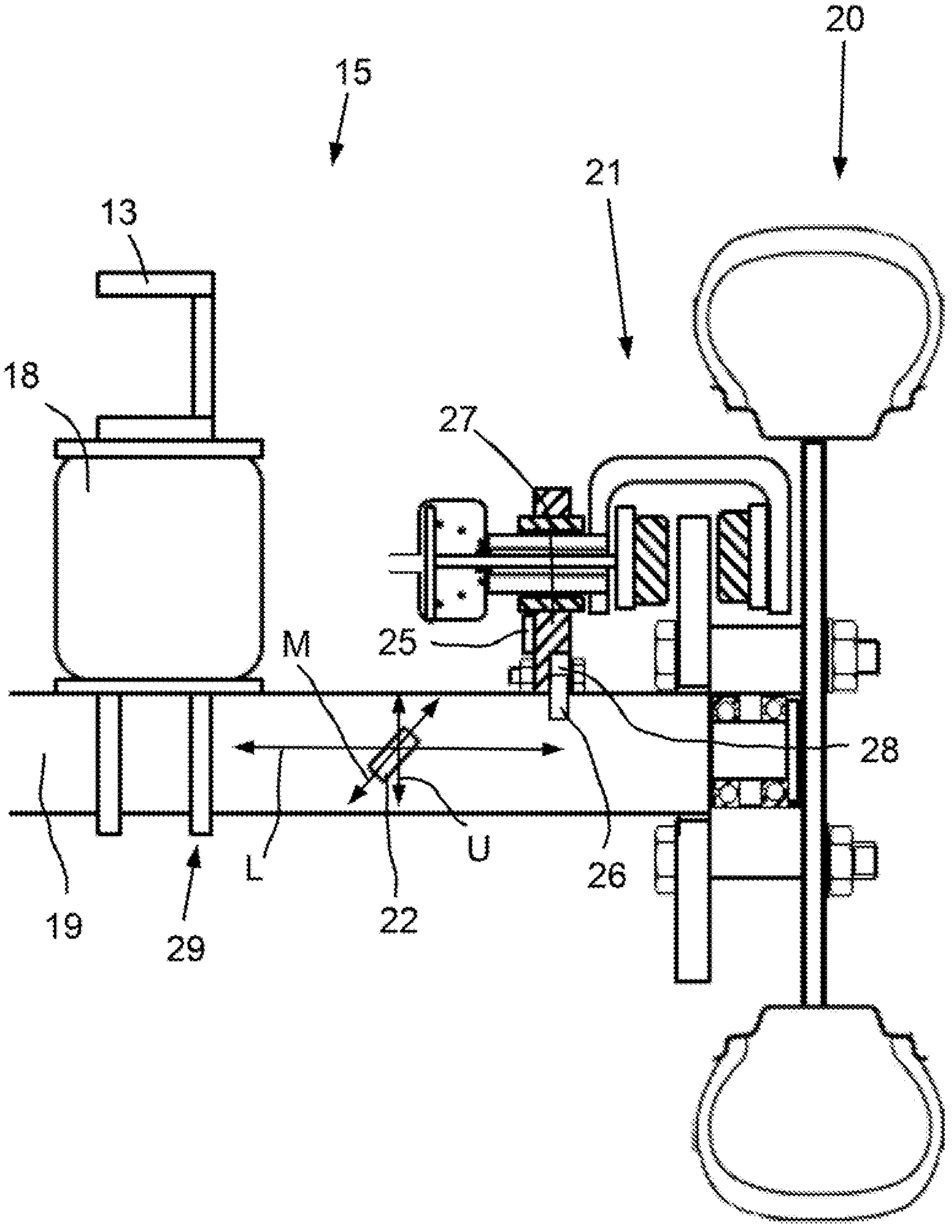
FIG. 3 shows a half view of an axle tube with a holder, wheel and wheel brake.

FIG. 3 shows a half view of an axle 15 with a greatly simplified representation of the bearing of the axle tube 19. Only the air suspension bellows 18 and the longitudinal member 13 are shown. Three different possible positions of sensors 22, 25 and 26 can be seen. Sensor 22 is the strain gauge on the axle tube 19. Sensor 25 is a strain gauge on a brake pad carrier 27 of the wheel brake 21 provided here as a disc brake. During braking, a reaction force dependent on the braking force B acts on the brake pad carrier 27, which results in a slight deformation of the brake pad carrier 27. The deformation is detected with the sensor 25.

The brake pad carrier 27 is bolted to a brake caliper mount 28, which is non-rotatably mounted on the axle tube 19, for example by welding or screwing. During braking, the caliper mount 28 is also acted upon by a reaction force dependent on the braking force B, which leads to a slight deformation. The deformation can be detected with the sensor 26 in the form of a strain gauge. The sensor 26 can also be arranged across components, for example from the caliper mount 28 to the axle tube 19. A cross-component deformation is then detected.

For determining the braking forces in forward and reverse travel or for other reasons, an additional sensor may be provided on the axle tube 19 in addition to sensor 22, in particular on the rear surface of the axle tube 19, which is not visible in FIG. 3, and which is visually hidden by the axle tube 19 and the sensor 22.

Figure 4:
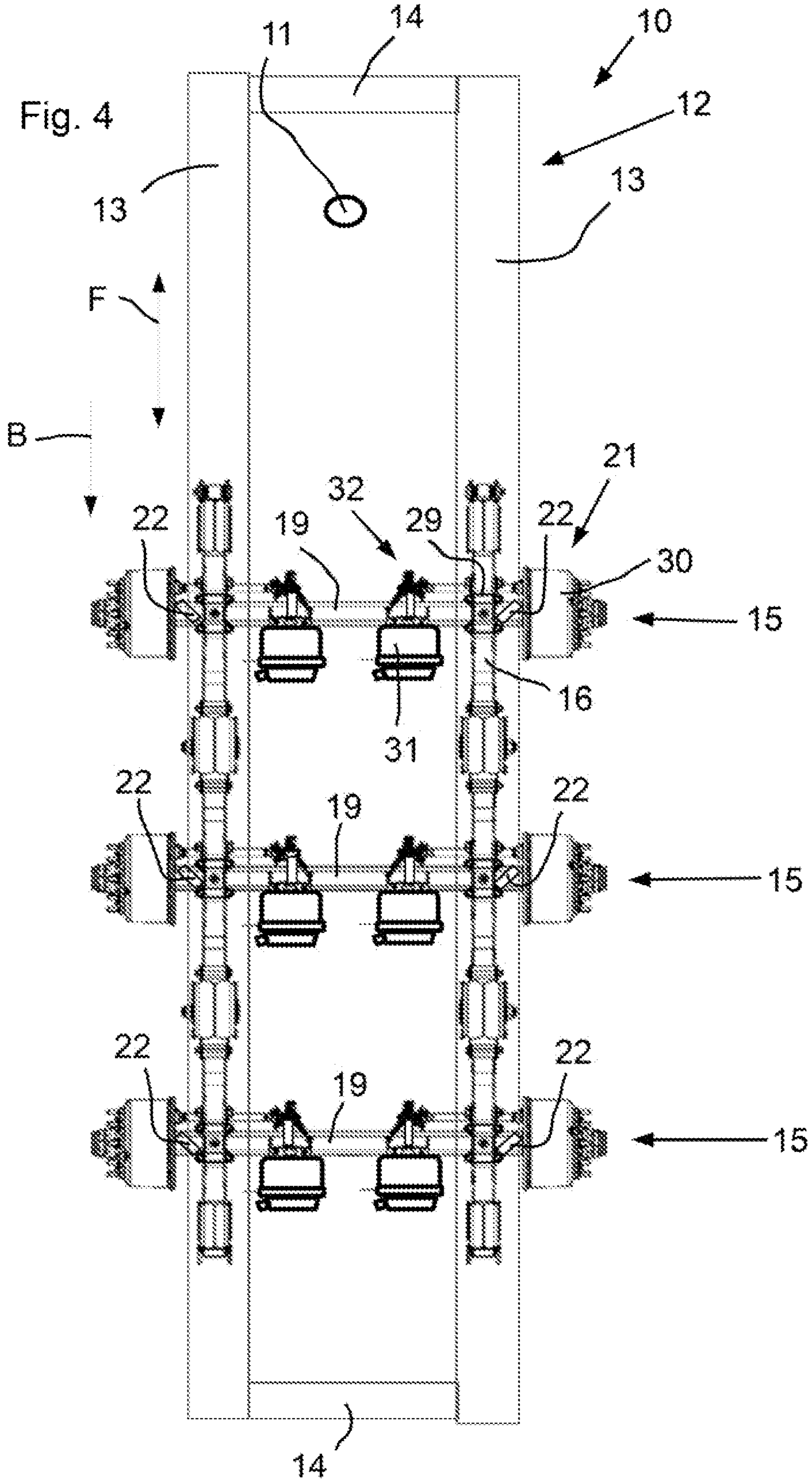
FIG. 4 shows a top view of a chassis of a semi-trailer with axles and drum brakes; and, FIG. 5 shows a view as in FIG. 3, but with further sensors or positions of the same.

FIG. 4 shows the chassis 10 with drum brakes as wheel brakes 21. Brake linings (not shown) in brake drums 30 are actuated by brake cylinders 31 via linkage adjusters 32. The brake cylinders 31 are mounted on the axle tubes 19 between the longitudinal members 13. Here, too, strain gauges are arranged as sensors 22 on the axle tubes 19, namely between brake drums 30 and axle brackets 29.

In all exemplary embodiments, at least one sensor 22 to 26 is assigned to each wheel 20. Sensors 22 to 26 can be provided on different components and in different positions. It is important to have an arrangement and an orientation such that an effect associated with the braking force of the respective wheel brake 21 can be measured.

The sensors 22 to 26 detect elastic deformations, a change in an electrical resistance or changes in magnetic fields directly or indirectly. Strain gauges detect a change in length indirectly via the electrical resistance. Force measurement bolts are provided with a strain gauge to detect deformation thereof or can detect a deformation due to changes in magnetic properties, as a magnetoelastic or magnetostrictive sensor. The use of sensors of a different kind is conceivable, as long as only the braking force that occurs can be determined indirectly.

The sensors 22 to 26 provide signals that can be evaluated by the braking system, which is not shown, for example for detecting dragging brakes and/or insufficient braking force in relation to a current brake pressure. The braking force can be individually determined and monitored for each wheel 20. The sensors require no moving parts and can be located outside the thermally highly loaded wheel brakes 21.

Figure 5:
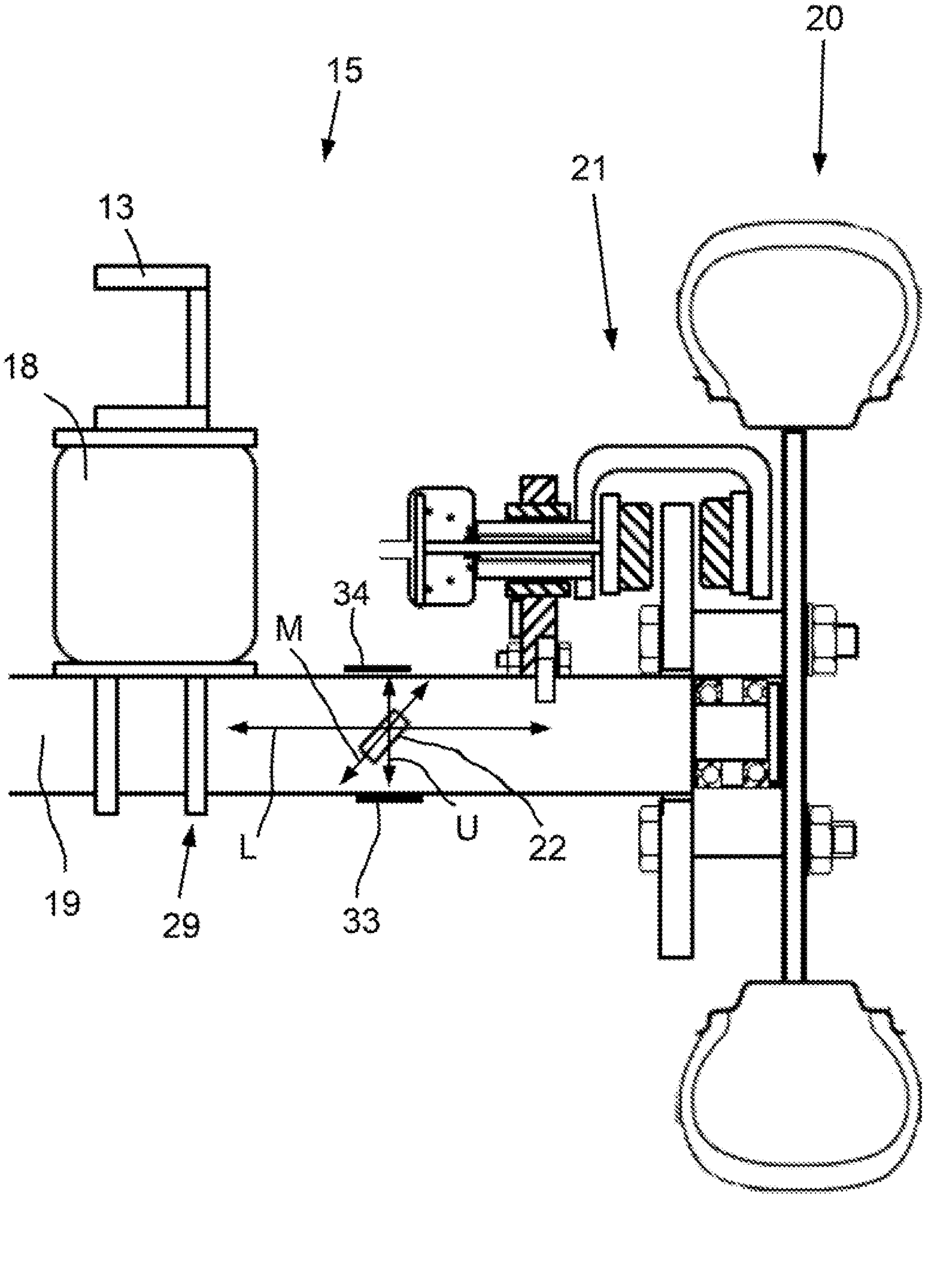

The sensors 22 can be arranged on the top, bottom, front and/or back of the axles 15 or axle tubes 19 for determining the torsion, as well as in an intermediate position. FIG. 5 shows sensors 33, 34 on and under the axle tube 19. Two or more sensors can also be arranged in combination, for example two sensors 22, 34 on the axle tube or two sensors 22, 33 under the axle tube.

In addition, sensors can be provided for axle load measurement. For example, sensors 33, 34 can be provided for determining the axle load by measuring the bending of the axle tube 19.

It is also possible to evaluate only one sensor for determining braking force and axle load, in particular for each wheel brake 21, see preferably sensors 33, 34.

It is understood that the foregoing description is that of the preferred embodiments of the invention and that various changes and modifications may be made thereto without departing from the spirit and scope of the invention as defined in the appended claims.

LIST OF REFERENCE SIGNS AS PART OF THE DESCRIPTION

10 Chassis
11 Kingpin
12 Chassis frame
13 Longitudinal member
14 Cross member
15 Axles
16 Trailing arm
17 Retaining brackets
18 Air suspension bellows
19 Axle tubes
20 Wheels

21 Wheel brakes
22 Sensor (on axle tube)
23 Sensor (on retaining bracket)
24 Sensor (force measurement bolt)
25 Sensor (on brake pad carrier)
26 Sensor (on the brake caliper mount)
27 Brake pad carrier
28 Brake caliper mount
29 Axle bracket
30 Brake drum
31 Brake cylinder
32 Linkage adjuster
33 Sensor (under the axle tube)
34 Sensor (on the axle tube)
B Braking force
F Longitudinal direction of the vehicle
L Longitudinal Direction of the Axle
M Measuring direction of the sensor
U Circumferential direction of the axle tube

The invention claimed is:

1. A method for determining a braking force on vehicles with wheel brakes, the method comprising determining, at least indirectly, a reaction force occurring on the vehicle during braking, wherein the reaction force is determined by a torsion measurement on an axle tube.

2. The method of claim 1, wherein the reaction force for each wheel brake is determined separately.

3. The method of claim 1, wherein said determining the reaction force includes measuring at least one of a change in mechanical variables, a change in magnetic variables, and a change in electrical variables.

4. The method of claim 3, wherein said determining the reaction force includes measuring at least one of an elastic deformation, a mechanical force, a magnetic field change, a change in an electrical resistance, and a change in a magnetic resistance.

5. The method of claim 4, wherein strain gauges or force measurement bolts are used as sensors for measuring a mechanical deformation.

6. The method of claim 1, wherein the reaction force on a component is determined between the wheel brakes inclusively and a chassis frame inclusively.

7. The method of claim 1, wherein the reaction force is determined at a junction between two components between the wheel brakes inclusively and a chassis frame inclusively.

8. The method of claim 1 further comprising determining, at least indirectly, an axle load.

9. The method of claim 8, wherein said determining the axle load includes measuring a mechanical deformation via strain gauges or force measurement bolts.

10. An axle assembly comprising:
an axle;
a wheel brake mounted on said axle;
at least one sensor configured to measure variables for determining reaction forces during braking; and,
an axle tube provided with at least one of said at least one sensor, wherein said at least one of said at least one sensor is a sensor for torsion measurement.

11. The axle assembly of claim 10, wherein a plurality of wheel brakes are mounted on said axle; and, at least one of said at least one sensor is provided for each of said plurality of wheel brakes for measuring the variables for the determination of the reaction forces.

12. The axle assembly of claim 10, wherein said at least one sensor includes at least one of a strain gauge, a force measurement bolt, a piezoelectric sensor, a magnetoelastic sensor, and a magnetostrictive sensor.

13. The axle assembly of claim 10, wherein said sensor for torsion measurement is a strain gauge and said strain gauge is arranged at an angle, that is, at an angle to a circumferential direction of said axle tube.

14. The axle assembly of claim 10, wherein said at least one sensor includes a force measurement bolt which holds a trailing arm for said axle in a retaining bracket.

15. The axle assembly of claim 10, wherein said at least one sensor includes a strain gauge arranged on a brake pad carrier.

16. The axle assembly of claim 10, wherein said at least one sensor includes a strain gauge arranged on a brake caliper mount.

17. The axle assembly of claim 10, wherein said at least one sensor includes two sensors arranged for determining the reaction forces for said wheel brake; and, said two sensors are oriented differently, such that variables are measurable in different directions.

18. The axle assembly of claim 10, wherein said at least one sensor includes a sensor for measuring an axle load.

19. The axle assembly of claim 18, wherein said sensor for measuring the axle load is at least one strain gauge.

20. A vehicle comprising the axle assembly of claim 10.

* * * * *